United States Patent
Yang et al.

(10) Patent No.: US 10,560,169 B2
(45) Date of Patent: Feb. 11, 2020

(54) CSI ACQUISITION WITH CHANNEL RECIPROCITY IN MOBILE COMMUNICATIONS

(71) Applicant: MediaTek Inc., Hsinchu (TW)

(72) Inventors: Weidong Yang, San Diego, CA (US); Lung-Sheng Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/933,610

(22) Filed: Mar. 23, 2018

(65) Prior Publication Data

US 2018/0278316 A1 Sep. 27, 2018

Related U.S. Application Data

(60) Provisional application No. 62/476,675, filed on Mar. 24, 2017, provisional application No. 62/479,349, filed on Mar. 31, 2017.

(51) Int. Cl.
*H04B 7/06* (2006.01)
*H04W 88/08* (2009.01)

(52) U.S. Cl.
CPC ......... *H04B 7/0626* (2013.01); *H04B 7/0617* (2013.01); *H04B 7/063* (2013.01);
(Continued)

(58) Field of Classification Search
CPC .. H04B 7/0695; H04B 7/0413; H04B 7/0691; H04B 7/0617; H04B 17/318; H04B 17/309
See application file for complete search history.

(56) References Cited

U.S. PATENT DOCUMENTS

2006/0114816 A1* 6/2006 Maltsev ............... H04B 7/0417
370/210
2011/0306383 A1* 12/2011 Lee, II .................. H04B 7/0691
455/522
(Continued)

FOREIGN PATENT DOCUMENTS

WO    WO 2011003291 A1    1/2011
WO    WO 2012152000 A1    11/2012
(Continued)

OTHER PUBLICATIONS

State Intellectual Property Office, International Search Report and Written Opinion for International Application No. PCT/CN2018/080524, dated Jun. 15, 2018.
(Continued)

*Primary Examiner* — Mansour Oveissi
(74) *Attorney, Agent, or Firm* — Han IP LLC; Andy M. Han

(57) ABSTRACT

A user equipment (UE) utilizes a first group of antenna ports at the UE for transmitting and receiving while utilizing a second group of antenna ports for receiving but not transmitting. The UE transmits to a base station (BS) a sounding reference signal (SRS) via the first group of antenna ports through a first channel of a communication link between the UE and the BS. The UE receives from the BS a channel state information reference signal (CSI-RS) via the first and second groups of antenna ports through the first channel and a second channel of the communication link. The UE determines an estimated channel response and a matrix such that a product of the matrix and a channel response of the first channel approximates a channel response of the second channel. The UE transmits to the BS a CSI feedback indicating at least the matrix.

20 Claims, 7 Drawing Sheets

(52) U.S. Cl.
CPC .......... *H04B 7/0632* (2013.01); *H04B 7/0639* (2013.01); *H04W 88/08* (2013.01)

(56) References Cited

U.S. PATENT DOCUMENTS

| | | | |
|---|---|---|---|
| 2014/0160957 A1* | 6/2014 | Zheng | H04W 24/02 370/252 |
| 2014/0334564 A1* | 11/2014 | Singh | H04B 7/0413 375/267 |
| 2015/0009951 A1* | 1/2015 | Josiam | H04L 25/0224 370/330 |
| 2018/0019795 A1* | 1/2018 | Zhang | H04B 7/0632 |

FOREIGN PATENT DOCUMENTS

| | | |
|---|---|---|
| WO | WO 2012155507 A1 | 11/2012 |
| WO | WO 2015199414 A1 | 12/2015 |

OTHER PUBLICATIONS

ZTE, Beam selection and CSI acquisition for NR MIMO, 3GPP TSG RAN WG1 Meeting #86bis, Lisbon, Portugal, Oct. 10-14, 2016.

ZTE, Specification Impacts of Beamformed CSI-RS Configuration, 3GPP TSG RAN WG1 Meeting #82, Beijing, China, Aug. 24-28, 2015.

* cited by examiner

500

RECEIVE, BY A PROCESSOR OF A BASE STATION, FROM A USER EQUIPMENT (UE) A SOUNDING REFERENCE SIGNAL (SRS) TRANSMITTED VIA A FIRST GROUP OF ANTENNA PORTS OF TWO GROUPS OF ANTENNA PORTS AT THE UE THROUGH A FIRST CHANNEL OF A COMMUNICATION LINK BETWEEN THE UE AND THE BASE STATION
510

TRANSMIT, BY THE PROCESSOR, TO THE UE A CHANNEL STATE INFORMATION REFERENCE SIGNAL (CSI-RS) WHICH IS RECEIVED BY THE UE VIA THE FIRST GROUP AND A SECOND GROUP OF THE TWO GROUPS OF ANTENNA PORTS THROUGH THE FIRST CHANNEL AND A SECOND CHANNEL OF THE COMMUNICATION LINK:
- THE UE USES THE FIRST GROUP OF ANTENNA PORTS FOR BOTH TRANSMITTING AND RECEIVING;
- THE UE USES THE SECOND GROUP OF ANTENNA PORTS FOR RECEIVING BUT NOT TRANSMITTING

520

RECEIVE, BY THE PROCESSOR, FROM THE UE A CSI FEEDBACK INDICATING A MATRIX, A TRANSMISSION RANK, AND A CHANNEL QUALITY INDICATOR (CQI), WITH A PRODUCT OF THE MATRIX AND A CHANNEL RESPONSE OF THE FIRST CHANNEL APPROXIMATING A CHANNEL RESPONSE OF THE SECOND CHANNEL
530

FIG. 5

```
                              600 ─┐
                                    ↘

┌─────────────────────────────────────────────────────────────┐
    │  MEASURE, BY A PROCESSOR OF A USER EQUIPMENT (UE), A CHANNEL STATE   │
    │  INFORMATION REFERENCE SIGNAL (CSI-RS) TRANSMITTED BY A BASE STATION │
    │                              610                             │
    └─────────────────────────────────────────────────────────────┘
                                    │
                                    ▼
    ┌─────────────────────────────────────────────────────────────┐
    │  TRANSMIT, BY THE PROCESSOR, A SOUNDING REFERENCE SIGNAL (SRS) TO THE │
    │  BASE STATION, WITH ANTENNAS OF THE UE TRANSMITTING THE SRS BEING ALL OR │
    │            PARTLY USED IN RECEIVING THE CSI-RS               │
    │                              620                             │
    └─────────────────────────────────────────────────────────────┘
                                    │
                                    ▼
    ┌─────────────────────────────────────────────────────────────┐
    │  IDENTIFY, BY THE PROCESSOR, A BEAM AMONG A PLURALITY OF BEAMS │
    │  ASSOCIATED WITH THE CSI-RS TRANSMITTED BY THE BASE STATION, WITH THE │
    │  IDENTIFIED BEAM HAVING A HIGHEST STRENGTH AMONG THE PLURALITY OF BEAMS │
    │              ASSOCIATED WITH THE CSI-RS                      │
    │                              630                             │
    └─────────────────────────────────────────────────────────────┘
                                    │
                                    ▼
    ┌─────────────────────────────────────────────────────────────┐
    │  REPORT, BY THE PROCESSOR, TO THE BASE STATION TO INDICATE A GROUP OF │
    │           BEAMS THAT ARE ADJACENT THE IDENTIFIED BEAM         │
    │                              640                             │
    └─────────────────────────────────────────────────────────────┘
```

```
┌─────────────────────────────────────────────────────────────┐
│ RECEIVE, BY A PROCESSOR OF A BASE STATION, A SOUNDING       │
│ REFERENCE SIGNAL (SRS) FROM A USER EQUIPMENT (UE)           │
│                          710                                │
└─────────────────────────────────────────────────────────────┘
                              │
                              ▼
┌─────────────────────────────────────────────────────────────┐
│ IDENTIFY, BY THE PROCESSOR, A BEAM AMONG A PLURALITY OF     │
│ BEAMS ASSOCIATED WITH THE SRS TRANSMITTED BY THE UE, WITH   │
│ THE IDENTIFIED BEAM HAVING A HIGHEST STRENGTH AMONG THE     │
│ PLURALITY OF BEAMS ASSOCIATED WITH THE SRS                  │
│                          720                                │
└─────────────────────────────────────────────────────────────┘
                              │
                              ▼
┌─────────────────────────────────────────────────────────────┐
│ TRANSMIT, BY THE PROCESSOR, TO THE UE A CHANNEL STATE       │
│ INFORMATION REFERENCE SIGNAL (CSI-RS)                       │
│                          730                                │
└─────────────────────────────────────────────────────────────┘
                              │
                              ▼
┌─────────────────────────────────────────────────────────────┐
│ RECEIVE, BY THE PROCESSOR, FROM THE UE A REPORT COMPRISING  │
│ INDICATORS THAT INDICATE A GROUP OF BEAMS FROM A SET OF     │
│ CANDIDATE BEAMS ADJACENT TO THE IDENTIFIED BEAM             │
│                          740                                │
└─────────────────────────────────────────────────────────────┘
```

FIG. 7

CSI ACQUISITION WITH CHANNEL RECIPROCITY IN MOBILE COMMUNICATIONS

CROSS REFERENCE TO RELATED PATENT APPLICATION

The present disclosure claims the priority benefit of U.S. Provisional Patent Application Nos. 62/476,675 and 62/479,349, filed on 24 Mar. 2017 and 31 Mar. 2017, respectively. Contents of the aforementioned applications are incorporated by reference in their entirety.

TECHNICAL FIELD

The present disclosure is generally related to mobile communications and, more particularly, to channel state information (CSI) acquisition with channel reciprocity in mobile communications.

BACKGROUND

Unless otherwise indicated herein, approaches described in this section are not prior art to the claims listed below and are not admitted as prior art by inclusion in this section.

In wireless communications, channel state information (CSI) refers to information on known channel properties of a communication link having multiple channels. CSI typically describes how a signal propagates from a transmitter (Tx) to a receiver (Rx). CSI also indicates combined effects experienced or suffered by signals transmitted over the communication channels such as, for example, fading, scattering, and power decay. Estimation of CSI, however, can be difficult at times. For example, denoting the communication link as two channels, where one channel is that between base station and the first group of Rx antennas and another channel is that between base station and the second group of Rx antennas, partial channel reciprocity can be considered when the number of transmitters (e.g., one Tx) is less than the number of receivers (e.g., two Rx) at a user equipment (UE).

When there is only one Tx at the UE for transmitting a sounding reference signal (SRS) to the base station without SRS switching, a base station (e.g., gNB or eNB) can only obtain partial information (e.g., information about either of two channels) but not the full channel state information (e.g., information about both of the two channels). In this scenario, regarding CSI acquisition with partial channel reciprocity, only one of the two channels can be estimated by the base station in case that there is no SRS switching. As such, it is difficult for the base station to have correct estimation on noise power at the UE side. Specifically, the base station cannot use channel quality indicator (CQI) derived from full channel state information to derive noise power at the UE side, since one of the two channels is unknown.

Thus, in cases where only partial channel reciprocity is available at the base station, there is a need to allow the base station to effectively obtain full (or almost full) channel state information. Moreover, in cases where only partial channel reciprocity is available at the base station, there is also a need for the ability to identify missing spatial basis to conduct spatial multiplexing transmission.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions and schemes that address the aforementioned issues pertaining to partial channel reciprocity. One proposed scheme in accordance with the present disclosure is related to partial CSI feedback, and another proposed scheme in accordance with the present disclosure is related to CSI acquisition for reciprocity-based operation.

In one aspect, a method may involve a processor of a UE dividing a plurality of antenna ports at the UE into a first group and a second group, with the first group used for both transmitting and receiving and with the second group used for receiving but not transmitting. The method may also involve the processor transmitting to a base station a SRS via the first group of antenna ports through a first channel of a communication link between the UE and the base station. The method may further involve the processor receiving from the base station a channel state information reference signal (CSI-RS) via the first and second groups of antenna ports through the first channel and a second channel of the communication link. The method may also involve the processor determining an estimated channel response based on the receiving of the CSI-RS as well as determining a matrix such that a product of the matrix and a channel response of the first channel approximates a channel response of the second channel. The method may additionally involve the processor transmitting to the base station a CSI feedback indicating the matrix, a transmission rank, and a channel quality indicator (CQI).

In one aspect, a method may involve a processor of a base station receiving from a UE a SRS transmitted via a first group of antenna ports of two groups of antenna ports at the UE through a first channel of a communication link between the UE and the base station. The method may also involve the processor transmitting to the UE a CSI-RS which is received by the UE via the first group and a second group of the two groups of antenna ports through the first channel and a second channel of the communication link. The method may further involve the processor receiving from the UE a CSI feedback indicating a matrix, a transmission rank, and a CQI. The UE may use the first group of antenna ports for both transmitting and receiving, and the UE may use the second group of antenna ports for receiving but not transmitting. A product of the matrix and a channel response of the first channel may approximate a channel response of the second channel.

In one aspect, a method may involve a processor of a UE measuring a CSI-RS transmitted by a base station. The method may additionally involve the processor transmitting a SRS to the base station, with antennas of the UE used in transmitting the SRS being all or partly used in receiving the CSI-RS. The method may also involve the processor identifying a beam among a plurality of beams associated with the CSI-RS transmitted by the base station and the SRS. The method may further involve the processor reporting to the base station to indicate a group of beams that are adjacent the identified beam.

In one aspect, a method may involve a processor of a base station receiving a SRS from a UE. The method may also involve the processor identifying a beam among a plurality of beams associated with the SRS transmitted by the UE.

The method may further involve the processor transmitting to the UE a CSI-RS. The method may additionally involve the processor receiving from the UE a report comprising indicators that indicate a group of beams from a set of candidate beams adjacent to the identified beam.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR) and Internet-of-Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a flowchart of an example process in accordance with an implementation of the present disclosure.

FIG. 6 is a flowchart of an example process in accordance with an implementation of the present disclosure.

FIG. 7 is a flowchart of an example process in accordance with an implementation of the present disclosure.

DETAILED DESCRIPTION OF PREFERRED EMBODIMENTS

Figure 1:
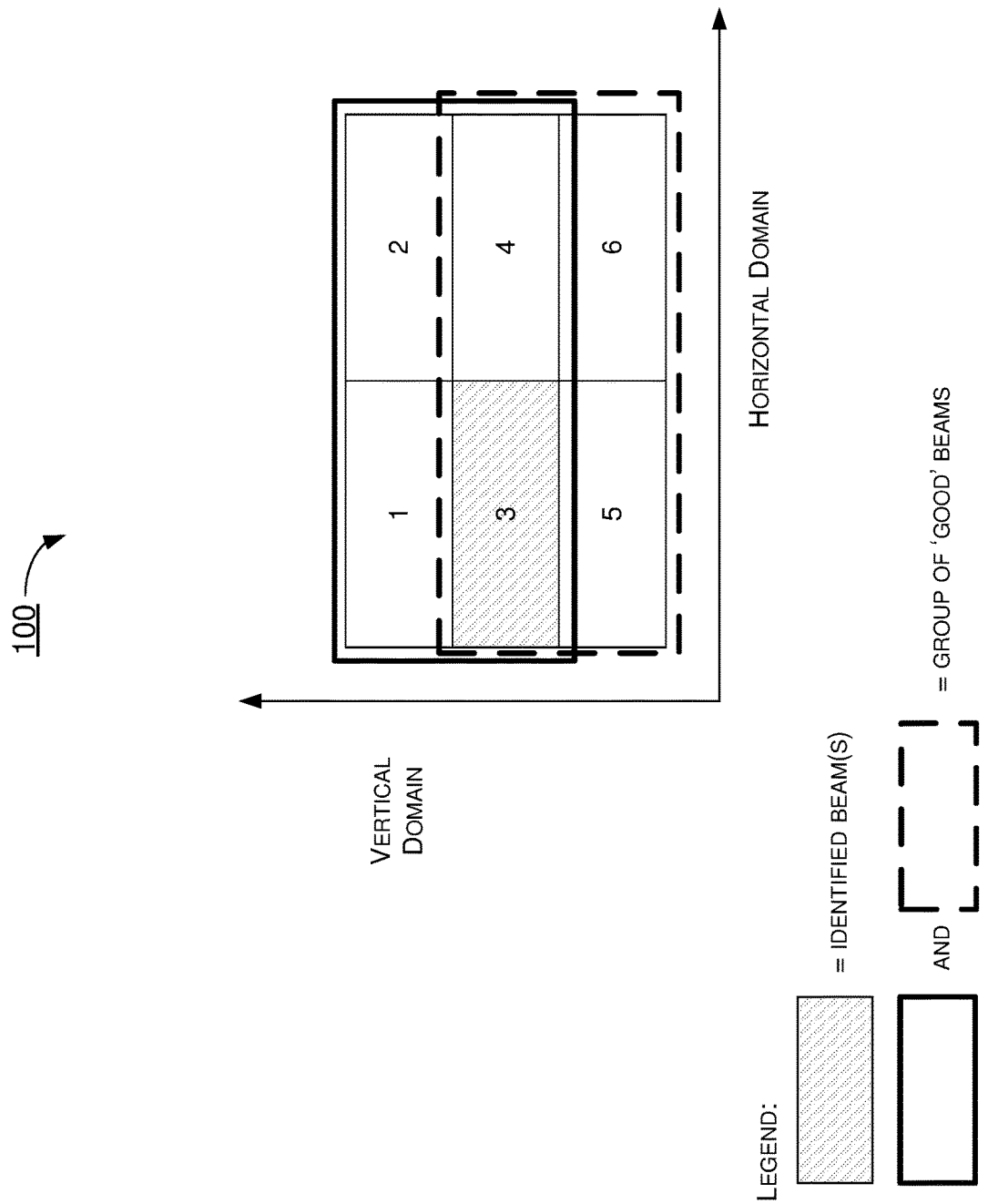
FIG. 1 is a diagram depicting an example scenario of beam identification in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to CSI acquisition with channel reciprocity in mobile communications. According to the present disclosure, a number of possible solutions may be implemented separately or jointly. That is, although these possible solutions may be described below separately, two or more of these possible solutions may be implemented in one combination or another.

Under proposed schemes in accordance with the present disclosure, exchange of information may occur among nodes in a wireless network. Each node in the wireless network may be a network apparatus (e.g., a base station (BS)) or a communication apparatus (e.g., a user equipment (UE)). For instance, a UE may transmit a SRS to a BS, and a BS may transmit a CSI reference signal (CSI-RS) to the UE. Herein, a BS may be an eNB in an LTE-based network of a gNB in a 5G/NR network.

Partial CSI Feedback

Under a proposed scheme of partial CSI feedback, the partial CSI available at base station and supplementary information provided by UE may be utilized to derive full channel state information. Under the proposed scheme, the partial CSI available at base station from uplink sounding (e.g., SRS from the UE) may be treated as basis functions or vectors, with which the full channel response is represented approximately. Moreover, under the proposed scheme, partial pilots not covering all transmission antennas of the base station may be utilized to support the aforementioned approximation.

Under the proposed scheme of partial CSI feedback, a receiver model at UE may be expressed by Equation (1) below.

$$r_k = H_k x + w = \begin{bmatrix} h_1^k & \cdots & h_{N_t}^k \end{bmatrix} x + \qquad (1)$$

$$w = \begin{bmatrix} H_{1,k} \\ H_{2,k} \end{bmatrix} x + w = \begin{bmatrix} h_{1,1}^k & \cdots & h_{1,N_t}^k \\ h_{2,1}^k & \cdots & h_{2,N_t}^k \end{bmatrix} x + w,$$

In Equation (1), $r_k$ denotes the signal received at subband/subcarrier k, w denotes noise, $H_{1,k}$ denotes a $N_1 \times N_{tx}$ matrix representing channel response of a first channel, and $H_{2,k}$ denotes a $N_2 \times N_{tx}$ matrix representing channel response of a second channel. The value $N_{tx}$ denotes the number of antennas at the base station that are used for both receive and transmit functions. The total number of receive antennas is $N_1 + N_2$.

Under the proposed scheme, the antenna ports at the UE may be divided into two groups, referred to as "group one" and "group two" herein. Group one of antenna ports at the UE may include antenna ports n, $1 \le n \le N_1$. One assumption is that antenna ports from group one are used for both transmit and receive. Another assumption is that there is no calibration error so as to simplify the consideration. It is noteworthy that calibration error between Rx and Tx can exist due to hardware imperfections and/or differences of Rx/Tx chains at the UE and base station. Group two of antenna ports at the UE may include antenna ports n, $N_1+1 \le n \le N_1+N_2$. One assumption is that antennas in group two are used for receiving but not transmitting.

For Millimeter Wave (mmW), it is possible for group one of antenna ports at the UE to include antenna ports from one panel including antenna ports for both polarizations, and for group two to include antenna ports from other panels. At lower carrier frequencies, e.g., 2 GHz, it is possible for group one to include two antenna ports at different polarizations or the same polarization, and for group two to include antenna ports from the rest of antenna ports at the UE.

The selection of antenna ports for SRS transmission may take the spatial channel property obtained from the antenna ports into consideration. For example, in an event that a UE is equipped with four pairs of cross-pol antennas as $x_2^1 x_4^3 x_6^5 x_8^7$, antennas 1 and 2 are located on a panel, and they may be used for uplink sounding. In another setup, at lower frequencies, it may be possible to use antennas 1 and 8 to capture spatial channel property along two polarization directions, as they are well separated, and each furnished transmit-and-receive (TRX) chains and they share the same frequency synthesizer for the UE. In an event that $$+_2^1 +_4^3$$

are used at a UE, then it is possible that antennas 1 and 3 are used for uplink sounding.

Under the proposed scheme of partial CSI feedback, it may be assumed that, through SRS transmission from group one antennas, the base station knows $H_{1,k}$ or its estimate $\tilde{H}_{1,k}$. The issue is that, as group two antennas are not used for SRS transmission, the base station does not have knowledge of $H_{2,k}$. Under the proposed scheme, one possible solution is to find a matrix $C_{N_2 \times N_1}$ so that the relation expressed in Equation (2) below can be established.

$$CH_{1,k} = H_{2,k} \qquad (2)$$

Accordingly, the signal received, r, may be expressed by Equation (3) below.

$$r \approx \begin{bmatrix} H_{1,k} \\ CH_{1,k} \end{bmatrix} x + w, \qquad (3)$$

As Equation (2) is unlikely to be valid for more than one subband at the same time, C in general has a dependence on the specific subband. In another word, C is a function of k, and $C_k$ would be the more precise notation to indicate its dependence on k. Tradeoff has to be taken between feedback accuracy and feedback overhead. Accordingly, a matrix C may be identified so that Equation (3) is approximately true over M subbands (the whole system bandwidth or subbands of interest to the base station can be divided into multiple groups of M subbands), as expressed by Equation (4) below.

$$\min_C \sum_{k=1}^{M} \|CH_{1,k} - H_{2,k}\|^2, \qquad (4)$$

Here, the feedback overhead is $N_2 \times N_1$ complex coefficients.

Taking one step further, antenna ports at the base station may be divided into two or more groups according to polarization or multi-panel membership. For instance, let $H_{m,k,p}$ be the channel response for base station antennas from polarization P and UE antenna group m at subband k (e.g., polarization 1 is for 45° and polarization 2 is for −45°), then the receiver model can be expressed by Equation (5) below.

$$r_k = \begin{bmatrix} H_{1,k,1} & H_{1,k,2} \\ H_{2,k,1} & H_{2,k,2} \end{bmatrix} \begin{bmatrix} x_1 \\ x_2 \end{bmatrix} + w, \qquad (5)$$

Moreover, the approximation may be taken separately for each polarization, as expressed by Equation (6) below.

$$C_p H_{1,k,p} = H_{2,k,p} \qquad (6)$$

Here, the feedback overhead is $N_2 \times N_1 \times P$ complex coefficients.

Under the proposed scheme, another possible solution is to find a matrix $D_{N_t \times N_t}$ so that the relation expressed in Equation (7) below can be established.

$$H_{1,k} D = H_{2,k}, \text{ if } N_1 = N_2. \qquad (7)$$

For the case with $N_1 \geq N_2$, $N_2$ rows of $H_{1,k}$ may be selected to form a matrix $\bar{H}_{1,k}$. Accordingly, matrix $D_{N_t \times N_t}$ may be expressed by Equation (8) below.

$$\bar{H}_{1,k} D = H_{2,k}. \qquad (8)$$

A criterion similar to that for Equation (3) may be used to determine a suitable $D_{N_t \times N_t}$.

Given that there are $N_t^2$ complex coefficients, which may lead to huge overhead for feedback, $D_{N_t \times N_t}$ may be considered as a diagonal matrix as expressed by Equation (9) below.

$$D_{N_t \times N_t} = \begin{bmatrix} d_1 & 0 & \cdots & 0 \\ & d_2 & & \\ & & \ddots & \\ & & & d_{N_t} \end{bmatrix}. \qquad (9)$$

The overhead may be further reduced by partitioning the $d_i$ into G sets, $\{S_1, S_2, \ldots, S_g, \ldots, S_G\}$, such that the $d_i$ within the same set are the same. The set Sg contains the column indexes of $D_{N_t \times N_t}$ (or equivalently, the column indexes of the channel H) within the $g^{th}$ set, with the feedback overhead having G complex coefficients. For example, when forming two sets, then $d_1 = d_2 = \ldots = d_{N_t/2} = v_1$ and $d_{N_t/2+1} = d_{N_t/2+2} = \ldots = d_{N_t} = v_2$. The value of each $d_i$ may be quantized for its amplitude and/or phase to further reduce overhead.

Following this approach of approximating $H_{2,k}$ by $H_{1,k} D$, it is noteworthy that $d_i$ acts as a common scaling coefficient that maps the channel response belonging to group one to the channel response belonging to group two. To derive the common scaling coefficient $d_i$ for the set Sg, it is not necessary to let UE obtain channel information for all $\{h_i | i \in S_g\}$ by measuring pilots on antenna ports associated with $\{h_i | i \in S_g\}$. For example, suppose the set S contains the first $S_1 = \{1, \ldots, N_t/2\}$ and $S_2 = \{N_t/2+1, \ldots, N_t\}$, ideally $d_1$ may be determined by Equation (10) below.

$$\min_{d_1, d_2} \sum_{k=1}^{M} \|H_{1,k} D - H_{2,k}\|^2, \text{ which leads to} \qquad (10)$$

$$\min_{d_1} \sum_{k=1}^{M} \sum_{i=1}^{N_t/2-1} \|d_1 h_{1,i}^k - h_{2,i}^k\|^2 \text{ and } \min_{d_2} \sum_{k=1}^{M} \sum_{i=N_t/2+1}^{N_t} \|d_2 h_{1,i}^k - h_{2,i}^k\|^2.$$

Although $\{h_{1,i}^k | i \in S_1\}$ and $\{h_{2,i}^k | i \in S_1\}$ are needed to derive $d_1$, a good approximation may be considering Equation (11) below.

$$\min_{d_1} \sum_{k=1}^{M} \sum_{i=1}^{N_t/4-1} \|d_1 h_{1,i}^k - h_{2,i}^k\|^2. \qquad (11)$$

That is, the first $N_t/4$ columns of H, but not the rest of H, are needed to be estimated at UE side to determine $d_1$. This approximation saves the pilot overhead to train UE to obtain the channel estimation. Such pilots are most likely to be channel state information reference signal (CSI-RS). In other words, the UE may obtain channel information by measuring a set of CSI-RS ports, which may not need to cover all $N_t$ ports and should be with sufficient number of ports to derive C or D described above. As a result, the overhead at the base station may be reduced. Additionally, processing effort (e.g., computation and power consumption) by the UE in estimating the channel associated with CSI-RS ports may be minimized or otherwise reduced.

With respect to the calculation of CQI at the UE, as the UE can derive C or D as described above, the UE may also need to calculate the corresponding CQI. The UE may assume a singular value decomposition (SVD) on the approximated channel response $$\begin{bmatrix} H_{1,k} \\ CH_{1,k} \end{bmatrix}$$

is performed at the base station. For other cases, the appropriate approximated channel response may be used, e.g., by considering base station antenna polarization/panel group. The singular vectors for the dominant singular values may be used as precoders for downlink transmission. Also, the identified precoders (e.g., singular vectors) may be applied to the estimated channel response $$\begin{bmatrix} H_{1,k} \\ H_{2,k} \end{bmatrix}$$

to obtain the effective channel response after precoding. CQI calculation procedure may utilize the effective channel response. The best transmission rank at base station may be identified, which leads to the highest throughput at UE among all transmission rank candidates. Accordingly, the C (or D), transmission rank, and CQI thus obtained may be transmitted by the UE back to the base station.

For multi-user multiple-input and multiple-output (MU-MIMO) transmission, with explicit channel feedback and partially reciprocal channel feedback as disclosed here, one issue is that the base station may not be aware of the approximation/quantization error when an explicit channel feedback is used (e.g., by quantizing the channel coefficients). With the proposed scheme as described above, the base station may not be aware of the difference between $$\begin{bmatrix} H_{1,k} \\ H_{2,k} \end{bmatrix} \text{ and } \begin{bmatrix} H_{1,k} \\ CH_{1,k} \end{bmatrix}.$$

With such knowledge, the base station may assume the worst-case perturbation on $$\begin{bmatrix} H_{1,k} \\ CH_{1,k} \end{bmatrix}.$$

Hence, under the proposed scheme for both explicit channel feedback and partially reciprocal channel feedback, the UE may calculate and transmit to the base station an approximation error ratio, $$\frac{\|\text{estimated channel response} - \text{approximated channel response}\|^2}{\|\text{approximated channel response}\|^2}.$$

As an example, the estimated channel response may be $$\begin{bmatrix} H_{1,k} \\ H_{2,k} \end{bmatrix},$$

and the approximated channel response may be $$\begin{bmatrix} H_{1,k} \\ CH_{1,k} \end{bmatrix}.$$

In view of the above, under the proposed scheme of partial CSI feedback, the feedback transmitted by the UE to the base station may include C (or D), transmission rank, CQI, and the approximation error ratio.

CSI Acquisition for Reciprocity-Based Operation

Under another proposed scheme in accordance with the present disclosure, CSI acquisition may be achieved by the base station with the aid of partial CSI from SRS transmission by the UE. That is, partial CSI provided by SRS transmission may be put to good use. In general, hybrid CSI may be considered under this proposed scheme.

Under the proposed scheme, antennas in a two-dimensional (2D) antenna array at the base station may be divided into two groups according to polarization. One example with eight pairs of cross-pol antennas at base station may be $$x_9^1 \ x_{10}^2 \ x_{11}^3 \ x_{12}^4 \ x_{13}^5 \ x_{14}^6 \ x_{15}^7 \ x_{16}^8,$$

in which antenna 1 through antenna 8 may form one group while antenna 9 through antenna 16 may form another group.

The following description pertains to the configuration of one Tx and two Rx at the UE.

At UE side, it may be assumed that a pair of cross pol antennas $x_2^1$ are used. The receiver model may be expressed by Equation (12) below.

$$r = \begin{bmatrix} H_{11} & H_{12} \\ H_{21} & H_{22} \end{bmatrix} \begin{bmatrix} x_1 \\ x_2 \end{bmatrix} + w, \qquad (12)$$

In Equation (12), r is 2×1, $H_{11}$, which is a 1×8 matrix, denotes the channel response between UE antenna 1 and base station antennas 1~8, $H_{12}$, which is a 1×8 matrix, denotes the channel response between UE antenna 1 and base station antennas 9~16, $H_{21}$, which is a 1×8 matrix, denotes the channel response between UE antenna 2 and base station antennas 1~8, and $H_{22}$, which is a 1×8 matrix, denotes the channel response between UE antenna 2 and base station antennas 9~16. From SRS transmission at UE antenna 1, $H_{11}$ and $H_{12}$ may be approximately estimated or otherwise determined by the base station.

Under the assumption of $R_1 = H_1^H H_{11} + H_{12}^H H_{12}$, where $(\ )^H$ is the Hermitian operator, accumulation over multiple tones in the frequency domain may be used to obtain a wideband or subband $R_1$. An eigenvector decomposition on $R_1$ may be performed at the base station, as expressed by Equation (13) below.

$$R_1 = VDV^H, \qquad (13)$$

In Equation (13), D denotes a diagonal matrix with descending eigenvalues at the diagonals, $V_{8\times 8}$ denotes a unitary matrix, and $V=[v_1\ v_2\ \ldots\ v_8]$, where $v_i$ denotes 8×1 vector, $1 \le i \le 8$.

As there are two antennas at the UE, with respect to CSI acquisition, the base station needs to acquire the knowledge to decide whether rank 1 or rank 2 is preferred for downlink (DL) data transmission. To achieve this, the base station may apply the precoder $$\begin{bmatrix} v_1 & 0_{8\times 1} \\ 0_{8\times 1} & v_1 \end{bmatrix}$$

to its CSI-RS antenna ports 1~16 to obtain two virtualized CSI-RS ports.

On the UE side, over the virtualized CSI-RS ports, the UE may perform CSI measurement and reporting according to a reduced rank codebook (over the virtualized antenna ports (two ports) instead of all the antenna ports at base station (sixteen ports in this example)). For the reduced rank codebook, Class B codebook with beam selection as introduced for Class B at K=1 as in Rel-13 or the legacy LTE Rel-8 2 Tx codebook may be used. Along with rank indication, precoding matrix indicator (PMI) and the CQI may be calculated according to interference experienced at the UE. As potential the precoding process needs to be conducted for many UEs, aperiodic CSI-RS or CSI-RS use from a shared pool may be used.

It can be observed that the SRS transmission is used to reveal beam structure or a beam basis at the base station, and the base station uses the acquired beam basis to construct a precoder, which is used for CSI-RS antenna virtualization. The antenna virtualization process as described above is reminiscent of the construction of rank 2 precoder with Rel-13 Class A codebook with Configuration 1. The Class A codebook with Configuration 1 may be referred to as the "reference codebook construction", as the identified beams are used in place of Discrete Fourier Transform (DFT) beams in the precoder construction.

From the above, the partial CSI information provided by a single UE Tx antenna may be sufficient for the case with two UE antennas. It is noteworthy that it is also possible to perform SVD or eigen decomposition directly on $[H_{11} H_{12}]$, and the obtained dominant singular vectors may be used for CSI-RS precoder.

The following description pertains to the configuration of one Tx and more than two Rx at the UE.

When there are more than two UE Rx antennas, one possible way is to use more $v_i$ for CSI-RS antenna port virtualization. For example, the construction for a precoder may be $$P = \begin{bmatrix} [v_1 v_2] & 0_{8\times 2} \\ 0_{8\times 2} & [v_1 v_2] \end{bmatrix},$$

for a four-port CSI-RS virtualization. Once the basis (e.g., $\{v_1, v_2, \ldots, v_8\}$) is acquired, the base station may use other codebook constructions (e.g., configurations 2/3/4 in LTE) or even different $W_1$ constructions defined in NR for the precoding of CSI-RS ports.

The precoder choice at base station may be treated as an implementation issue, although a reference codebook construction is still beneficial to justify the generation of precoder. It is also possible to pursue the partial CSI-aided CSI acquisition through a standard-based approach.

Under the proposed scheme, the partial channel information in $[H_{11}H_{12}]$, which is obtained based on SRS measurement associated with SRS transmitted by part of antennas of the UE, may be used to identify a main beam from the base station to the UE, e.g., through correlation with all the beams in the codebook such as Class A codebook from Rel-13. For example, by performing correlation between $v_1$ from the procedure described above and codewords in a Class A codebook, the codeword with the strongest correlation with $v_1$ may be identified, and its composing beam(s) may also be identified.

In an event that there is a one-to-one mapping between an identified beam and a corresponding beam group in the codebook, beams from that beam group may be used for CSI-RS antenna port virtualization. Thus, rather than constructing a codebook according to channel observation directly via obtained eigen decomposition, the channel observation may be mapped into a beam group (e.g., in a Class A-like codebook) and then the identified beam group may be used to build the precoder.

In an event that the identified beam can be mapped into different beam groups, one extension to the above procedure may be that the base station uses a union of the beams in the beam groups to build the precoder. FIG. 1 illustrates an example scenario 100 of beam identification in accordance with an implementation of the present disclosure. In the example shown in FIG. 1, beam 3 may have a highest strength than beams 1, 2, 4, 5, 6. Moreover, beams 1, 2, 3 and 4 may be in one beam group and, alternatively, beams 3, 4, 5 and 6 may be in another beam group, with beam 3 (as well as beam 4) being a member of both beam groups. The base station may use some of beams 1~6 for CSI-RS port virtualization. It is noteworthy that orthonormal vectors for a subspace equivalent to subspace spanned by {beams 1~6} may be used instead for CSI-RS virtualization, and the choice of the orthonormal basis may be implementation based, e.g., depending on the preference of a base station vendor.

Figure 2:
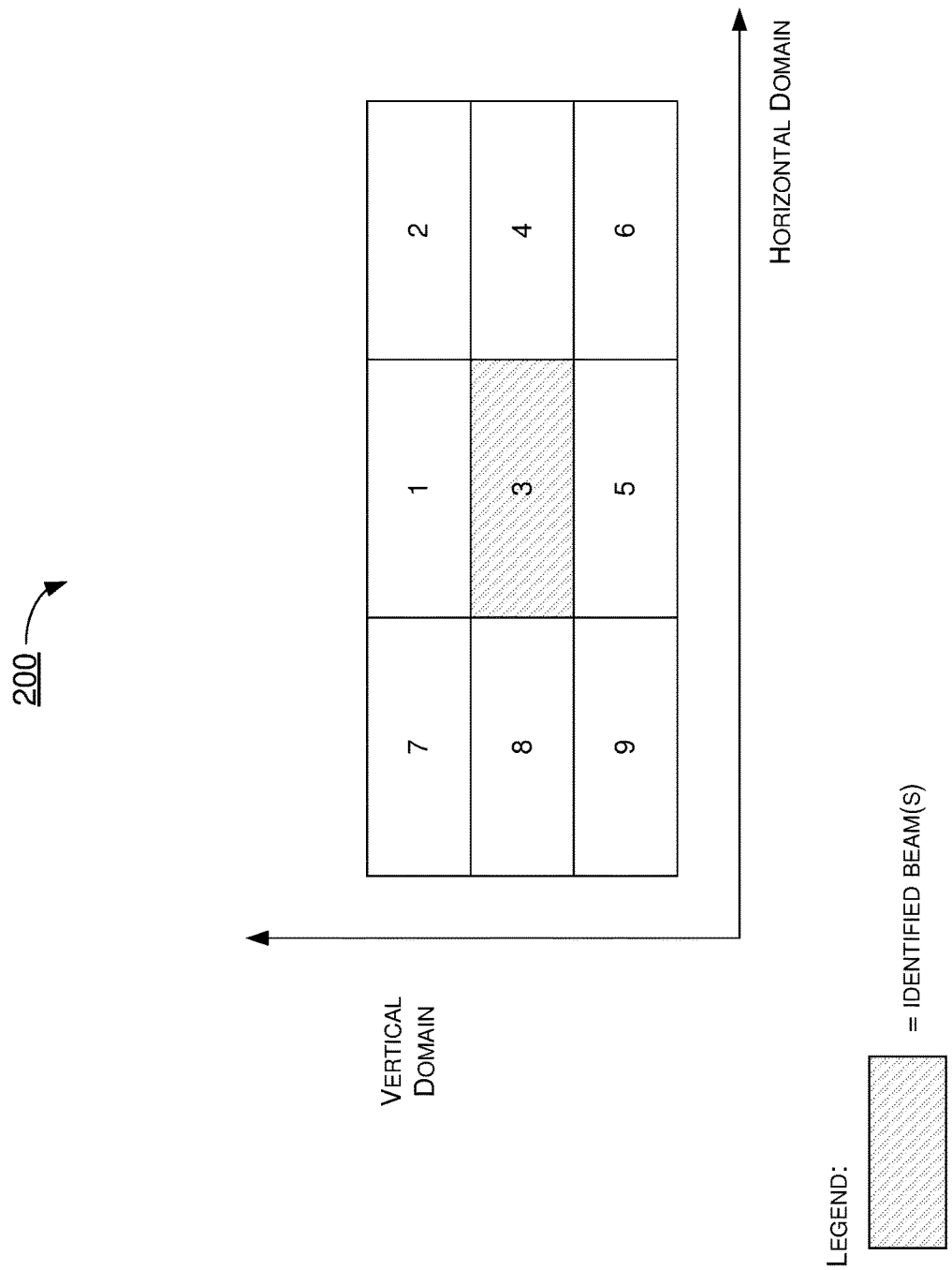
FIG. 2 is a diagram depicting another example scenario of beam identification in accordance with an implementation of the present disclosure.

In another approach under the proposed scheme, under an assumption that other beam directions with substantial links are likely to be adjacent to the identified beam, the base station may construct a beam group around the identified beam directly and beams in the beam group may be used to construct the precoder. In other words, adjacent beams may be used to form a beam group. FIG. 2 illustrates an example scenario 200 of beam identification in accordance with an implementation of the present disclosure. In the example shown in FIG. 2, beam 3, which is the identified beam, along with some beams from beams 1,2 and 4~9 may be used for precoder construction. It is noteworthy that orthonormal vectors for a subspace equivalent to subspace spanned by {beams 1~9} may be used instead for CSI-RS virtualization.

The choice of the orthonormal basis may be implementation based, e.g., depending on the preference of a base station vendor.

Under the proposed scheme, SVD may be also applied to the matrix [$b_1$ $b_2$ ... $b_9$], where $b_i$ denotes the beam vector for beam i, and the dominant singular vectors may be considered. For example, assuming the rank of the subpsace spanned by {beams 1~9} is 8, the base station may choose to use the top four dominant singular vectors for CSI-RS virtualization. It is noteworthy that the equivalence of subspaces proposed here is similar to the treatment on orthogonal beams versus non-orthogonal beams.

Thus, under the proposed scheme, a beam group may be defined to identify potential 'good' beams. The direction of identified beam may be based on SRS measurement with partial channel reciprocity. Moreover, missing basis vectors may be composed of adjacent orthogonal beams.

Under the proposed scheme, a base station may measure SRS transmitted by a UE to obtain or otherwise identify one or more "identified beam(s)", denoted as beam_gNB, and a UE may measure CSI-RS transmitted by the base station to obtain or otherwise identify one or more "identified beam(s)", denoted as beam_UE. Theoretically, with perfect channel reciprocity, beam_gNB may be very similar to beam_UE. Moreover, with partial channel reciprocity, beam_UE may be partially approximated by beam_gNB. For example, beam_gNB={v1} when beam_UE={v1, v2, v3, v4}, as v1 may be the beam with the highest strength among a plurality of beams based on the assumption with partial channel reciprocity. The UE may report (e.g., via CSI feedback) other beam indicator(s) to the base station to indicate other good beams that cannot be approximated by beam_gNB, under the assumption that the UE approximately knows what beam_gNB is by CSI-RS measurement. For example, with beam_UE={v1, v2, v3, v4}, the UE may make an assumption that the strongest beam in beam_UE=beam_gNB={v1}. Note that the UE may derive v1 based on partial channel information corresponding to the antennas transmitting SRS, instead of based on full channel information, so that the assumption is valid. Furthermore, the indicated beam(s) may be derived by the reported indicators and beam_UE. Other good beams may be orthogonal to beam_gNB or orthogonal to the precoder corresponding to a quantized version of beam_UE. The quantization may be realized by codebook defined in LTE or NR. For example, by quantizing v1 to the nearest vector defined in NR 2D-codebook with parameter (N1, N2, O1, O2) or quantizing v1 to the vector/codeword in the 2D codebook with highest correlation, the UE and the base station may share the same understanding on what adjacent orthogonal beams are. The other good beams may be selected and indicated by the UE from the adjacent orthogonal beams. The base station may derive good beams by beam_gNB and feedback on one or more other beam indicator(s) from the UE. The base station may also apply beam_gNB and/or derived good beams for DL transmission or for beamformed CSI-RS transmission.

Illustrative Implementations

Figure 3:
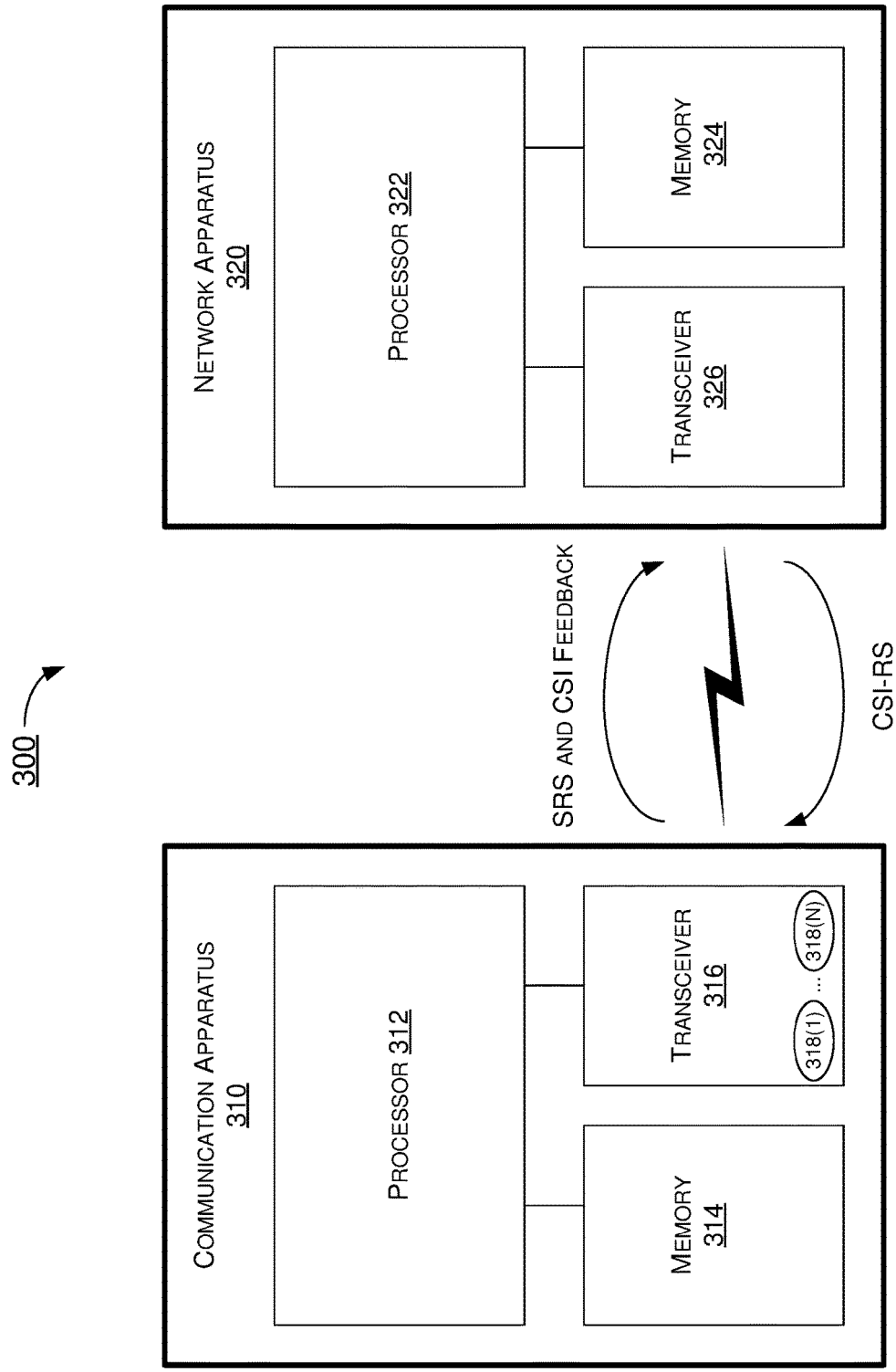
FIG. 3 is a block diagram of an example system in accordance with an implementation of the present disclosure.

FIG. 3 illustrates an example system 300 having at least an example apparatus 310 and an example apparatus 320 in accordance with an implementation of the present disclosure. Each of apparatus 310 and apparatus 320 may perform various functions to implement schemes, techniques, processes and methods described herein pertaining to CSI acquisition with channel reciprocity in mobile communications, including the various schemes described above with respect to various proposed designs, concepts, schemes, systems and methods described above as well as processes 400, 500, 600 and 700 described below.

Each of apparatus 310 and apparatus 320 may be a part of an electronic apparatus, which may be a network apparatus or a UE, such as a portable or mobile apparatus, a wearable apparatus, a wireless communication apparatus or a computing apparatus. For instance, each of apparatus 310 and apparatus 320 may be implemented in a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. When implemented in or as a network apparatus, apparatus 310 and/or apparatus 320 may be implemented in an eNodeB in a LTE, LTE-Advanced or LTE-Advanced Pro network or in a gNB or TRP in a 5G network, an NR network or an IoT network.

In some implementations, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 310 and apparatus 320 may be implemented in or as a network apparatus or a UE. Each of apparatus 310 and apparatus 320 may include at least some of those components shown in FIG. 3 such as a processor 312 and a processor 322, respectively, for example. Each of apparatus 310 and apparatus 320 may further include one or more other components not pertinent to the proposed scheme of the present disclosure (e.g., internal power supply, display device and/or user interface device), and, thus, such component(s) of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to CSI acquisition with channel reciprocity in mobile communications in accordance with various implementations of the present disclosure.

In some implementations, apparatus 310 may also include a transceiver 316 coupled to processor 312. Transceiver 316 may be capable of wirelessly transmitting and receiving data. Transceiver 316 may include multiple antenna ports 318(1)~318(N), with N being a positive integer greater than 1. In some implementations, apparatus 320 may also include a transceiver 326 coupled to processor 322. Transceiver 326 may include a transceiver capable of wirelessly transmitting and receiving data.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory.

For illustrative purposes and without limitation, a description of capabilities of communication apparatus 310, as a UE, and network apparatus 320, as a base station, is provided below.

In some implementations, processor 312 of communication apparatus 310 may divide a plurality of antenna ports 318(1)~318(N) into a first group and a second group, with the first group used for both transmitting and receiving and with the second group used for receiving but not transmitting. Additionally, processor 312 may transmit, via transceiver 316, to network apparatus 320 a SRS via the first group of antenna ports through a first channel of a communication link between communication apparatus 310 and network apparatus 320. Moreover, processor 312 may receive, via transceiver 316, from network apparatus 320 a CSI-RS via the first and second groups of antenna ports through the first channel and a second channel of the communication link. Also, processor 312 may determine an estimated channel response based on the receiving of the CSI-RS. Furthermore, processor 312 may determine a matrix such that a product of the matrix and a channel response of the first channel approximates a channel response of the second channel. Also, processor 312 may transmit, via transceiver 316, to network apparatus 320 a CSI feedback indicating the matrix, a transmission rank, and a CQI.

In some implementations, processor 312 may determine an approximated channel response using the matrix. Moreover, processor 312 may determine an approximation error ratio based on the estimated channel response and the approximated channel response. In some implementations, the approximation error ratio may be defined by an expression as follows:

$$\frac{\|\text{estimated channel response} - \text{approximated channel response}\|^2}{\|\text{approximated channel response}\|^2}.$$

In some implementations, the CSI feedback may further indicate the approximation error ratio.

In some implementations, processor 312 may measure a CSI-RS transmitted by network apparatus 320 as a base station. Furthermore, processor 312 may transmit, via transceiver 316, a SRS to network apparatus 320, with antennas 318(1) 318(N) used in transmitting the SRS being entirely or partially used in receiving the CSI-RS. For instance, with N=2, processor 312 may use both antennas 318(1) and 318(2) in receiving the CSI-RS while using either antenna 318(1) or antenna 318(2) in transmitting the SRS. Additionally, processor 312 may identify a beam among a plurality of beams associated with the CSI-RS transmitted by network apparatus 320. Moreover, processor 312 may report, via transceiver 316, to network apparatus 320 to indicate a group of beams that are adjacent the identified beam.

In some implementations, in measuring the CSI-RS transmitted by network apparatus 320, processor 312 may measure a respective strength of each beam of the plurality of beams associated with the CSI-RS.

In some implementations, in identifying the beam among the plurality of beams associated with the CSI-RS, processor 312 may determine that the identified beam as having the highest strength among the plurality of beams associated with the CSI-RS based on the measuring.

In some implementations, in reporting to network apparatus 320 to indicate the group of beams that are adjacent to the identified beam, processor 312 may estimate, based on a result of the measuring, a beam identified and used by network apparatus 320 to be the identified beam. Additionally, processor 312 may generate indicators that indicate the group of beams. Moreover, processor 312 may transmit, via transceiver 316, the indicators to network apparatus 320.

In some implementations, the group of beams may include beams orthogonal to the identified beam. Alternatively, the group of beams may include beams orthogonal to precoders corresponding to a quantized version of the identified beam and the group of beams.

In some implementations, the identified beam may have a highest strength among the plurality of beams associated with the CSI-RS.

In some implementations, processor 322 of network apparatus 320 may receive, via transceiver 326, from communication apparatus 310 a SRS transmitted via a first group of antenna ports of two groups of antenna ports at communication apparatus 310 through a first channel of a communication link between communication apparatus 310 and network apparatus 320. Additionally, processor 322 may transmit, via transceiver 326, to communication apparatus 310 a CSI-RS which is received by communication apparatus 310 via the first group and a second group of the two groups of antenna ports through the first channel and a second channel of the communication link. Communication apparatus 310 may use the first group of antenna ports for both transmitting and receiving, and communication apparatus 310 may use the second group of antenna ports for receiving but not transmitting. Moreover, processor 322 may receive, via transceiver 326, from communication apparatus 310 a CSI feedback indicating a matrix, a transmission rank, and a CQI. A product of the matrix and a channel response of the first channel may approximate a channel response of the second channel.

In some implementations, the CSI feedback may further indicate an approximation error ratio. In some implementations, the approximation error ratio may be defined by an expression as follows:

$$\frac{\|\text{estimated channel response} - \text{approximated channel response}\|^2}{\|\text{approximated channel response}\|^2}.$$

The estimated channel response and the approximated channel response may be determined by the UE.

In some implementations, processor 322 may perform downlink transmissions to communication apparatus 310 by utilizing at least the matrix and the approximation error ratio.

In some implementations, processor 322 may receive, via transceiver 326, a SRS from communication apparatus 310. Additionally, processor 322 may identify a beam among a plurality of beams associated with the SRS transmitted by communication apparatus 310. Moreover, processor 322 may transmit, via transceiver 326, to communication apparatus 310 a CSI-RS. Furthermore, processor 322 may receive, via transceiver 326, from communication apparatus 310 a report including indicators that indicate a group of beams from a set of candidate beams that are adjacent to the identified beam.

In some implementations, processor 322 may derive a set of beams comprising the identified beam and the group of beams based on the report. The identified beam may have a highest strength among the plurality of beams associated with the SRS.

In some implementations, processor 322 may perform either or both of the following: (1) utilizing the set of beams in downlink transmissions to communication apparatus 310; and (2) performing beamformed CSI-RS transmissions to communication apparatus 310.

In some implementations, in deriving the set of beams comprising the identified beam and the group of beams, processor 322 may derive the group of beams as beams orthogonal to the identified beam. Alternatively, in deriving the set of beams comprising the identified beam and the group of beams, processor 322 may derive the group of beams as beams orthogonal to precoders corresponding to a quantized version of the identified beam.

Illustrative Processes

Figure 4:
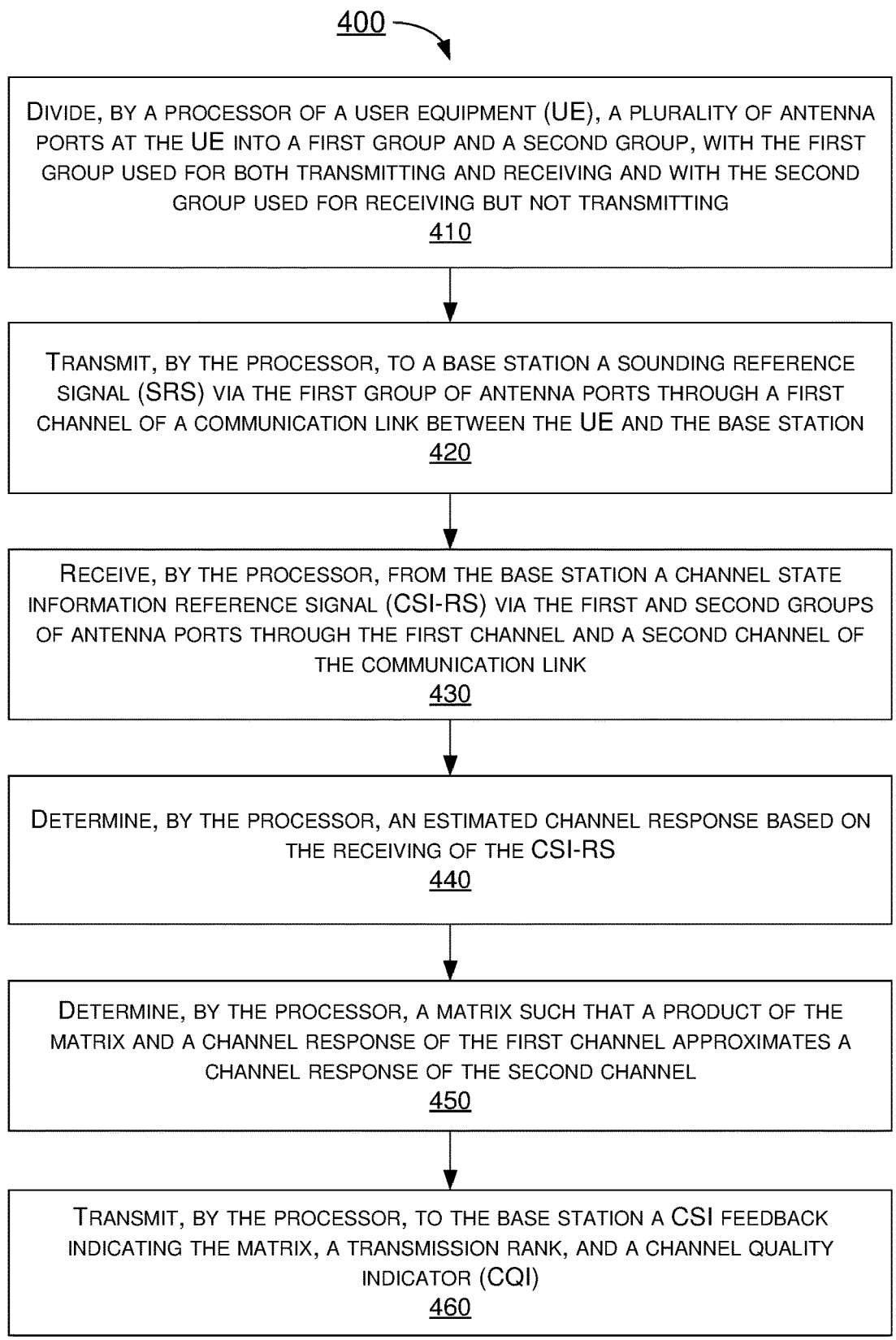
FIG. 4 is a flowchart of an example process in accordance with an implementation of the present disclosure.

FIG. 4 illustrates an example process 400 in accordance with an implementation of the present disclosure. Process 400 may represent an aspect of implementing CSI acquisition with channel reciprocity in mobile communications, including the various schemes described above with respect to various proposed designs, concepts, schemes, systems and methods described above. More specifically, process 400 may represent an aspect of the proposed concepts and schemes pertaining to CSI acquisition with channel reciprocity in mobile communications. For instance, process 400 may be an example implementation, whether partially or completely, of the proposed schemes described above for CSI acquisition with channel reciprocity in mobile communications. Process 400 may include one or more operations, actions, or functions as illustrated by one or more of blocks 410, 420, 430, 440, 450 and 460. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. The blocks/sub-blocks of process 400 may be executed iteratively. Process 400 may be implemented by or in communication apparatus 310 and network apparatus 320 as well as any variations thereof. Solely for illustrative purposes and without limiting the scope, process 400 is described below in the context of communication apparatus 310 as a UE and network apparatus 320 as a base station. Process 400 may begin at block 410.

At 410, process 400 may involve processor 312 of communication apparatus 310 as a UE dividing a plurality of antenna ports 318(1)~318(N) into a first group and a second group, with the first group used for both transmitting and receiving and with the second group used for receiving but not transmitting. Process 400 may proceed from 410 to 420.

At 420, process 400 may involve processor 312 transmitting, via transceiver 316, to network apparatus 320 as a base station a SRS via the first group of antenna ports through a first channel of a communication link between communication apparatus 310 and network apparatus 320. Process 400 may proceed from 420 to 430.

At 430, process 400 may involve processor 312 receiving, via transceiver 316, from network apparatus 320 a CSI-RS via the first and second groups of antenna ports through the first channel and a second channel of the communication link. Process 400 may proceed from 430 to 440.

At 440, process 400 may involve processor 312 determining an estimated channel response based on the receiving of the CSI-RS. Process 400 may proceed from 440 to 450.

At 450, process 400 may involve processor 312 determining a matrix such that a product of the matrix and a channel response of the first channel approximates a channel response of the second channel. Process 400 may proceed from 450 to 460.

At 460, process 400 may involve processor 312 transmitting, via transceiver 316, to network apparatus 320 a CSI feedback indicating the matrix, a transmission rank, and a CQI.

In some implementations, process 400 may involve processor 312 performing a number of additional operations. For instance, process 400 may involve processor 312 determining an approximated channel response using the matrix. Processor 400 may further involve processor 312 determining an approximation error ratio based on the estimated channel response and the approximated channel response. In some implementations, the approximation error ratio may be defined by an expression as follows:

$$\frac{\|\text{estimated channel response} - \text{approximated channel response}\|^2}{\|\text{approximated channel response}\|^2}.$$

In some implementations, the CSI feedback may further indicate the approximation error ratio.

FIG. 5 illustrates an example process 500 in accordance with an implementation of the present disclosure. Process 500 may represent an aspect of implementing CSI acquisition with channel reciprocity in mobile communications, including the various schemes described above with respect to various proposed designs, concepts, schemes, systems and methods described above. More specifically, process 500 may represent an aspect of the proposed concepts and schemes pertaining to CSI acquisition with channel reciprocity in mobile communications. For instance, process 500 may be an example implementation, whether partially or completely, of the proposed schemes described above for CSI acquisition with channel reciprocity in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. The blocks/sub-blocks of process 500 may be executed iteratively. Process 500 may be implemented by or in communication apparatus 310 and network apparatus 320 as well as any variations thereof. Solely for illustrative purposes and without limiting the scope, process 500 is described below in the context of communication apparatus 310 as a UE and network apparatus 320 as a base station. Process 500 may begin at block 510.

At 510, process 500 may involve processor 322 of network apparatus 320 as a base station receiving, via transceiver 326, from communication apparatus 310 as a UE a SRS transmitted via a first group of antenna ports of two groups of antenna ports at communication apparatus 310 through a first channel of a communication link between communication apparatus 310 and network apparatus 320. Process 500 may proceed from 510 to 520.

At 520, process 500 may involve processor 322 transmitting, via transceiver 326, to communication apparatus 310 a CSI-RS which is received by communication apparatus 310 via the first group and a second group of the two groups of antenna ports through the first channel and a second channel of the communication link. Communication apparatus 310 may use the first group of antenna ports for both transmitting and receiving, and communication apparatus 310 may use the second group of antenna ports for receiving but not transmitting. Process 500 may proceed from 520 to 530.

At 530, process 500 may involve processor 322 receiving, via transceiver 326, from communication apparatus 310 a CSI feedback indicating a matrix, a transmission rank, and a CQI. A product of the matrix and a channel response of the first channel may approximate a channel response of the second channel.

In some implementations, the CSI feedback may further indicate an approximation error ratio. In some implementations, the approximation error ratio may be defined by an expression as follows:

$$\frac{\|\text{estimated channel response} - \text{approximated channel response}\|^2}{\|\text{approximated channel response}\|^2}.$$

The estimated channel response and the approximated channel response may be determined by the UE.

In some implementations, process 500 may also involve processor 322 performing downlink transmissions to communication apparatus 310 by utilizing at least the matrix and the approximation error ratio.

FIG. 6 illustrates an example process 600 in accordance with an implementation of the present disclosure. Process 600 may represent an aspect of implementing CSI acquisition with channel reciprocity in mobile communications, including the various schemes described above with respect to various proposed designs, concepts, schemes, systems and methods described above. More specifically, process 600 may represent an aspect of the proposed concepts and schemes pertaining to CSI acquisition with channel reciprocity in mobile communications. For instance, process 600 may be an example implementation, whether partially or completely, of the proposed schemes described above for CSI acquisition with channel reciprocity in mobile communications. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. The blocks/sub-blocks of process 600 may be executed iteratively. Process 600 may be implemented by or in communication apparatus 310 and network apparatus 320 as well as any variations thereof. Solely for illustrative purposes and without limiting the scope, process 600 is described below in the context of communication apparatus 310 as a UE and network apparatus 320 as a base station. Process 600 may begin at block 610.

At 610, process 600 may involve processor 312 of communication apparatus 310 as a UE measuring a CSI-RS transmitted by network apparatus 320 as a base station. Process 600 may proceed from 610 to 620.

At 620, process 600 may involve processor 312 transmitting a sounding reference signal (SRS) to network apparatus 320. Antennas of communication apparatus 310 used in transmitting the SRS may be all or partially used in receiving the CSI-RS. Process 620 may proceed from 620 to 630.

At 630, process 600 may involve processor 312 identifying a beam among a plurality of beams associated with the CSI-RS transmitted by network apparatus 320. Process 620 may proceed from 630 to 640.

At 640, process 600 may involve processor 312 reporting, via transceiver 316, to network apparatus 320 to indicate a group of beams that are adjacent the identified beam.

In some implementations, in measuring the CSI-RS transmitted by network apparatus 320, process 600 may involve processor 312 measuring a respective strength of each beam of the plurality of beams associated with the CSI-RS.

In some implementations, in identifying the beam among the plurality of beams associated with the CSI-RS, process 600 may involve processor 312 determining that the identified beam as having the highest strength among the plurality of beams associated with the CSI-RS based on the measuring.

In some implementations, in reporting to network apparatus 320 to indicate the group of beams that are adjacent to the identified beam, process 600 may involve processor 312 performing a number of operations. For instance, process 600 may involve processor 312 estimating, based on a result of the measuring, a beam identified and used by network apparatus 320 to be the identified beam. Additionally, process 600 may involve processor 312 generating indicators that indicate the group of beams. Moreover, process 600 may involve processor 312 transmitting the indicators to network apparatus 320.

In some implementations, the group of beams may include beams orthogonal to the identified beam. Alternatively, the group of beams may include beams orthogonal to precoders corresponding to a quantized version of the identified beam and the group of beams.

In some implementations, the identified beam may have a highest strength among the plurality of beams associated with the CSI-RS.

FIG. 7 illustrates an example process 700 in accordance with an implementation of the present disclosure. Process 700 may represent an aspect of implementing CSI acquisition with channel reciprocity in mobile communications, including the various schemes described above with respect to various proposed designs, concepts, schemes, systems and methods described above. More specifically, process 700 may represent an aspect of the proposed concepts and schemes pertaining to CSI acquisition with channel reciprocity in mobile communications. For instance, process 700 may be an example implementation, whether partially or completely, of the proposed schemes described above for CSI acquisition with channel reciprocity in mobile communications. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. The blocks/sub-blocks of process 700 may be executed iteratively. Process 700 may be implemented by or in communication apparatus 310 and network apparatus 320 as well as any variations thereof. Solely for illustrative purposes and without limiting the scope, process 700 is described below in the context of communication apparatus 310 as a UE and network apparatus 320 as a base station. Process 700 may begin at block 710.

At 710, process 700 may involve processor 322 of network apparatus 320 as a base station receiving, via transceiver 326, a SRS from communication apparatus 310 as a UE. Process 700 may proceed from 710 to 720.

At 720, process 700 may involve processor 322 identifying a beam among a plurality of beams associated with the SRS transmitted by communication apparatus 310. Process 700 may proceed from 720 to 730.

At 730, process 700 may involve processor 322 transmitting to communication apparatus 310 a CSI-RS. Process 700 may proceed from 730 to 740.

At 740, process 700 may involve processor 322 receiving from communication apparatus 310 a report including indicators that indicate a group of beams from a set of candidate beams adjacent to the identified beam.

In some implementations, process 700 may also involve processor 322 deriving a set of beams comprising the identified beam and the group of beams based on the report. The identified beam may have a highest strength among the plurality of beams associated with the SRS.

In some implementations, process 700 may further involve processor 322 performing either or both of the following: (1) utilizing the set of beams in downlink transmissions to communication apparatus 310; and (2) performing beamformed CSI-RS transmissions to communication apparatus 310.

In some implementations, in deriving the set of beams comprising the identified beam and the group of beams, process 700 may involve processor 322 deriving the group of beams as beams orthogonal to the identified beam. Alternatively, in deriving the set of beams comprising the identified beam and the group of beams, process 700 may involve processor 322 deriving the group of beams as beams orthogonal to precoders corresponding to a quantized version of the identified beam.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   dividing, by a processor of a user equipment (UE), a plurality of antenna ports at the UE into a first group and a second group;
   transmitting, by the processor, to a base station a sounding reference signal (SRS) via the first group of antenna ports through a first channel of a communication link between the UE and the base station;
   receiving, by the processor, from the base station a channel state information reference signal (CSI-RS) via the first and second groups of antenna ports through the first channel and a second channel of the communication link;
   determining, by the processor, an estimated channel response based on the receiving of the CSI-RS;
   determining, by the processor, a matrix such that a product of the matrix and a first channel response of the first channel approximates a second channel response of the second channel; and
   transmitting, by the processor, to the base station a CSI feedback indicating the matrix, a transmission rank, and a channel quality indicator (CQI),
   wherein the dividing of the plurality of antenna ports at the UE into the first group and the second group comprises dividing the plurality of antenna ports at the UE into the first group comprising $n_1$ antenna ports, $1 \le n_1 \le N_1$, and the second group comprising $n_2$ antenna ports, $N_1+1 \le n_2 \le N_1+N_2$, with $n_1$, $n_2$, $N_1$, $N_2$, being positive integers and with assumptions that:
   the first group is used for both transmitting and receiving, and
   the second group used for receiving but not transmitting.

2. The method of claim 1, further comprising:
   determining, by the processor, an approximated channel response using the matrix; and
   determining, by the processor, an approximation error ratio based on the estimated channel response and the approximated channel response.

3. The method of claim 2, wherein the approximation error ratio is defined by an expression as follows:

$$\frac{\|\text{estimated channel response} - \text{approximated channel response}\|^2}{\|\text{approximated channel response}\|^2}.$$

4. The method of claim 2, wherein the CSI feedback further indicates the approximation error ratio.

5. A method, comprising:
   receiving, by a processor of a base station, from a user equipment (UE) a sounding reference signal (SRS) transmitted via a first group of antenna ports of two groups of antenna ports at the UE through a first channel of a communication link between the UE and the base station;
   transmitting, by the processor, to the UE a channel state information reference signal (CSI-RS) which is received by the UE via the first group and a second group of the two groups of antenna ports through the first channel and a second channel of the communication link; and
   receiving, by the processor, from the UE a CSI feedback indicating a matrix, a transmission rank, and a channel quality indicator (CQI),
   wherein a product of the matrix and a first channel response of the first channel approximates a second channel response of the second channel, and
   wherein the first group of antenna ports and the second group of antenna ports comprise the first group comprising $n_1$ antenna ports, $1 \le n_1 \le N_1$, and the second group comprising $n_2$ antenna ports, $N_1+1 \le n_2 \le N_1+N_2$, with $n_1$, $n_2$, $N_1$, $N_2$, being positive integers and with assumptions that:
   the first group is used for both transmitting and receiving, and
   the second group used for receiving but not transmitting.

6. The method of claim 5, wherein the CSI feedback further indicates an approximation error ratio.

7. The method of claim 6, wherein the approximation error ratio is defined by an expression involving an estimated channel response and an approximated channel response as follows:

$$\frac{\|\text{estimated channel response} - \text{approximated channel response}\|^2}{\|\text{approximated channel response}\|^2},$$

wherein the estimated channel response and the approximated channel response are determined by the UE.

8. The method of claim 6, further comprising:
   performing, by the processor, downlink transmissions to the UE by utilizing at least the matrix and the approximation error ratio.

9. A method, comprising:
   measuring, by a processor of a user equipment (UE), a channel state information reference signal (CSI-RS) transmitted by a base station;
   transmitting, by the processor, a sounding reference signal (SRS) to the base station, wherein antennas of the UE transmitting the SRS are all or partly used in receiving the CSI-RS;
   identifying, based on the measuring of the CSI-RS transmitted by the base station and by the processor, a first beam among a plurality of beams associated with the CSI-RS transmitted by the base station and the SRS; and
   reporting, by the processor, to the base station to indicate a group of beams that are adjacent the identified first beam.

10. The method of claim 9, wherein the identifying of the first beam among the plurality of beams comprises:
    performing correlation between a precoding vector and a plurality of codewords in a codebook; and
    identifying a first codeword of the plurality of precoding vector compared to correlations of other codewords of the plurality of codewords with the precoding vector, wherein the identified first beam is a composing beam of the identified first codeword.

11. The method of claim 9, wherein the identifying of the first beam among the plurality of beams associated with the CSI-RS comprises determining that the identified first beam as having the highest strength among the plurality of beams associated with the CSI-RS based on the measuring.

12. The method of claim 9, wherein the reporting to the base station to indicate the group of beams that are adjacent to the identified first beam comprises:
   estimating, based on a result of the measuring, a second beam identified and used by the base station to be the identified first beam;
   generating indicators that indicate the group of beams that are adjacent to the identified first beam; and
   transmitting the indicators to the base station.

13. The method of claim 9, wherein the group of beams comprises beams orthogonal to the identified first beam.

14. The method of claim 9, wherein the group of beams comprises beams orthogonal to precoders corresponding to a quantized version of the identified first beam and the group of beams having a reduced overhead with respect to amplitude, phase, or both, compared to the identified first beam.

15. The method of claim 9, wherein the identified first beam has a highest strength among the plurality of beams associated with the CSI-RS.

16. A method, comprising:
   receiving, by a processor of a base station, a sounding reference signal (SRS) from a user equipment (UE);
   identifying, by the processor, a beam among a plurality of beams used in transmission of the SRS by the UE;
   transmitting, by the processor, to the UE a channel state information reference signal (CSI-RS) for the UE to measure the CSI-RS; and;
   receiving, by the processor in response to transmitting the CSI-RS, from the UE a report comprising indicators that indicate a group of beams from a set of candidate beams adjacent to the identified beam,
   wherein the identifying of the beam among the plurality of beams used in the transmission of the SRS by the UE comprises:
      performing correlation between a precoding vector and a plurality of codewords in a codebook; and
      identifying a codeword of the plurality of codewords as having a strongest correlation with the precoding vector compared to correlations of other codewords of the plurality of codewords with the precoding vector, and
   wherein the identified beam is a composing beam of the identified codeword.

17. The method of claim 16, further comprising:
   deriving, by the processor based on the report received from the UE, a set of beams that comprises the identified beam and the group of beams,
   wherein the identified beam has a highest strength among the plurality of beams used in the transmission of the SRS.

18. The method of claim 17, further comprising:
   performing, by the processor, either or both of:
      utilizing the set of beams in downlink transmissions to the UE by transmitting downlink signals using the set of beams; and
      performing beamformed CSI-RS transmissions to the UE using the set of beams.

19. The method of claim 17, wherein the deriving of the set of beams comprises deriving the group of beams of the set of beams as beams orthogonal to the identified beam.

20. The method of claim 17, wherein the deriving of the set of beams comprises deriving the group of beams of the set of beams as beams orthogonal to precoders corresponding to a quantized version of the identified beam having a reduced overhead with respect to amplitude, phase, or both, compared to the identified beam.

* * * * *